United States Patent
Liao et al.

(10) Patent No.: US 11,303,378 B2
(45) Date of Patent: Apr. 12, 2022

(54) OPTICAL FORWARDING DEVICE

(71) Applicant: Chunghwa Telecom Co., Ltd., Taoyuan (TW)

(72) Inventors: Hung-Huei Liao, Taoyuan (TW); Chin-Cheng Hu, Taoyuan (TW)

(73) Assignee: Chunghwa Telecom Co., Ltd., Taoyuan (TW)

(*) Notice: Subject to any disclaimer, the term of this patent is extended or adjusted under 35 U.S.C. 154(b) by 51 days.

(21) Appl. No.: 16/936,402

(22) Filed: Jul. 22, 2020

(65) Prior Publication Data
US 2021/0226716 A1  Jul. 22, 2021

(30) Foreign Application Priority Data

Jan. 17, 2020  (TW) ................. 109101753

(51) Int. Cl.
*H04J 14/02* (2006.01)
*G02F 1/09* (2006.01)
*H04B 10/40* (2013.01)

(52) U.S. Cl.
CPC .............. *H04J 14/02* (2013.01); *G02F 1/093* (2013.01); *H04B 10/40* (2013.01)

(58) Field of Classification Search
CPC ...... H04J 14/02; H04J 14/0246; H04J 14/025; H04J 14/0278; H04J 14/00; H04J 14/0201; H04J 14/0241; H04J 14/0284; H04J 14/0216; H04J 14/0282; H04J 14/0213; H04J 14/0209; H04J 14/028; H04J 14/0279; H04J 14/0286; H04J 14/021; H04J 14/0247; G02F 1/093; H04B 10/40; H04B 10/2589; H04B 10/032; H04B 10/297; H04B 10/572; H04B 1/52; H04B 10/801; H04B 10/506; H04B 10/2725; H04Q 2011/0016
USPC ............................ 398/79, 82, 135, 138, 139
See application file for complete search history.

(56) References Cited

U.S. PATENT DOCUMENTS

| | | | |
|---|---|---|---|
| 6,895,091 B1 | 5/2005 | Elliott et al. |
| 7,236,597 B2 | 6/2007 | Elliott et al. |
| 9,614,622 B2 | 4/2017 | Babic et al. |

(Continued)

FOREIGN PATENT DOCUMENTS

TW  I536755  6/2016

*Primary Examiner* — Hibret A Woldekidan
(74) *Attorney, Agent, or Firm* — JCIPRNET

(57) ABSTRACT

An optical forwarding device includes a specific optical connector and an optical forwarding module. The optical forwarding module includes first and second optical connectors, first and second wavelength division multiplexers (WDM), and an optical circulator. The first WDM receives and forwards a first optical signal from the first optical connector. The optical circulator includes first, second, and third ports. The first port forwards the first optical signal from the first WDM. The second port forwards the first optical signal from the first port to the optical cable through the specific optical connector, and receives and forwards a second optical signal from the optical cable. The first and second optical signals have a first wavelength. The third port receives and forwards the second optical signal from the second port. The second WDM receives the second optical signal from the third port and sends the same to the second optical connector.

8 Claims, 3 Drawing Sheets

(56) References Cited

U.S. PATENT DOCUMENTS

2014/0140689 A1* 5/2014 Dahlfort ............... H04B 10/03
398/2
2019/0181952 A1* 6/2019 Jia ..................... H04B 10/2589

\* cited by examiner

OPTICAL FORWARDING DEVICE

CROSS-REFERENCE TO RELATED APPLICATION

This application claims the priority benefit of Taiwanese application serial no. 109101753, filed on Jan. 17, 2020. The entirety of the above-mentioned patent application is hereby incorporated by reference herein and made a part of this specification.

BACKGROUND

Technical Field

The disclosure relates to an optical network apparatus, and in particular relates to an optical forwarding device.

Description of Related Art

Currently, during the deployment process of the 5G fronthaul network, frequently occurring problems include a low utilization rate of optical fibers, and excessively high costs for preparation and deployment of color light module.

Therefore, it is an important issue for people having ordinary skill in the art to design a mechanism that improves the above problems.

SUMMARY

In view of the above, the disclosure provides an optical forwarding device, which is configured to solve the above technical problems.

The disclosure provides an optical forwarding device including a specific optical connector and a first optical forwarding module. The specific optical connector is coupled to an optical cable. The first optical forwarding module includes a first optical connector, a second optical connector, a first wavelength division multiplexer (WDM), a first optical circulator, and a second WDM. The first optical connector receives a first optical signal. The first WDM is coupled to the first optical connector, and receives and forwards the first optical signal from the first optical connector. The first optical circulator includes a first port, a second port, and a third port. The first port of the first optical circulator is coupled to the first WDM to receive the first optical signal, and forwards the first optical signal. The second port of the first optical circulator is coupled to the specific optical connector, forwards the first optical signal from the first port of the first optical circulator to the optical cable, receives a second optical signal from the optical cable, and forwards the second optical signal to the third port. The second optical signal and the first optical signal both have a first wavelength. The third port of the first optical circulator receives and forwards the second optical signal from the second port of the first optical circulator. The second WDM is coupled to the third port of the first optical circulator and the second optical connector, receives the second optical signal from the third port of the first optical circulator, and sends the second optical signal to the second optical connector.

To make the aforementioned more comprehensible, several embodiments accompanied with drawings are described in detail as follows.

DESCRIPTION OF THE EMBODIMENTS

Figure 1:
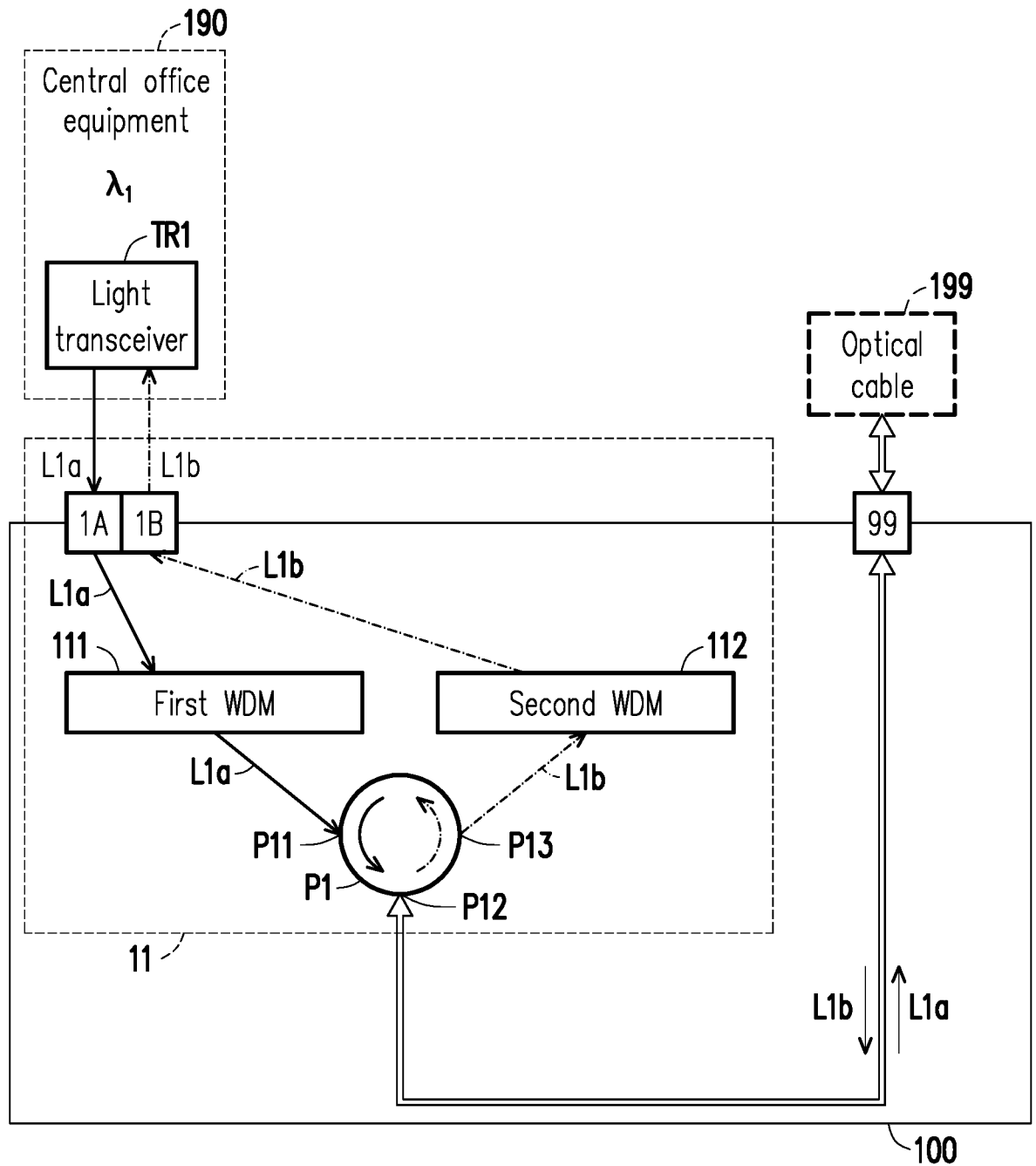
FIG. 1 is a schematic diagram of an optical forwarding device according to an embodiment of the disclosure.

FIG. 1 is a schematic diagram of an optical forwarding device according to an embodiment of the disclosure. As shown in FIG. 1, the optical forwarding device 100 of the disclosure includes a specific optical connector 99, and a first optical forwarding module 11. The specific optical connector 99 is coupled to an optical cable 199. The first optical forwarding module 11 includes an optical connector 1A, an optical connector 1B, a first WDM 111, a first optical circulator P1, and a second WDM 112.

In the embodiments of the disclosure, the optical connector 1A may receive an optical signal L1a. In one embodiment, the optical connector 1A may be coupled to an optical transceiver TR1 of central office equipment 190, and receive an optical signal L1a which has a wavelength $\lambda_1$ from the optical transceiver TR1, but is not limited thereto. The first WDM 111 is coupled to the optical connector 1A, receives the optical signal L1a from the optical connector 1A, and forwards the optical signal L1a to the first optical circulator P1.

The first optical circulator P1 includes a first port P11, a second port P12, and a third port P13. In the embodiments of the disclosure, the first port P11 of the first optical circulator P1 is a unidirectional input port, the second port P12 of the first optical circulator P1 is a bidirectional transmission port, and the third port P13 of the first optical circulator P1 is a unidirectional output port. In an embodiment, when an optical signal from outside the first optical circulator P1 is input to the first port P11, the first port P11 may direct the optical signal to the second port P12, so that the optical signal may be output by the second port P12. In addition, when another optical signal from outside the first optical circulator P1 are input to the second port P12, the second port P12 may direct the another optical signal to the third port P13, so that the another optical signal may be output by the third port P13.

As shown in FIG. 1, the first port P11 of the first optical circulator P1 is coupled to the first WDM 111 to receive the optical signal L1a. The optical signal L1a can be forwarded/directed to the second port P12 according to the above teachings to be output by the second port P12. The second port P12 of the first optical circulator P1 is coupled to the specific optical connector 99, and may forward/output the optical signal L1a from the first port P12 of the first optical circulator P1 to the optical cable 199. In addition, in an embodiment, the second port P12 of the first optical circulator P1 may also receive an optical signal L1b from the optical cable 199, and forward/direct the optical signal L1b to the third port P13. The optical signal L1b and the optical signal L1a both have a wavelength $\lambda_1$.

After receiving the optical signal L1b from the second port P12, the third port P13 of the first optical circulator P1 may forward the optical signal L1b to the second WDM 112.

The second WDM 112 is coupled to the third port P13 of the first optical circulator P1 and the optical connector 1B. In one embodiment, after receiving the optical signal L1b from the third port P13 of the first optical circulator P1, the second WDM 112 may send the optical signal L1b to the optical connector 1B. As shown in FIG. 1, the optical connector 1B may also be coupled to the optical transceiver TR1 of the central office equipment 190, and may send the optical signal L1b to the optical transceiver TR1.

It can be known from the above that, compared with the conventional technology, where it is only possible to communicate with the optical transceiver of the central office equipment in a dual optical wavelength manner through dual path, the configuration of the optical forwarding device 100 of the disclosure can achieve the effect of bidirectional transmission between the optical transceiver of the central office equipment through the single wavelength optical signals, and therefore only half the number of optical wavelengths is required to achieve the same communication effect as the conventional technology.

Figure 2:
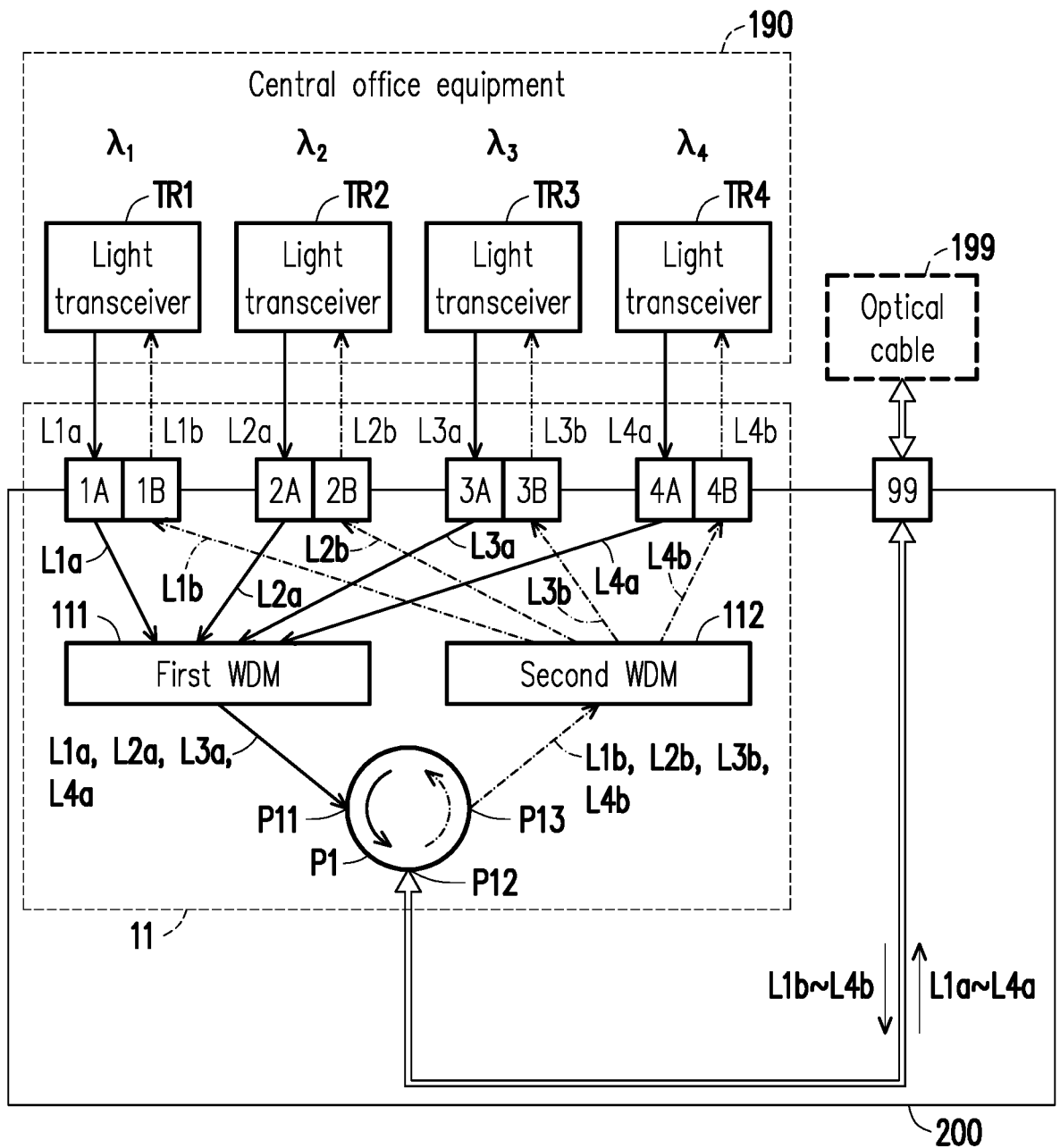
FIG. 2 is a schematic diagram of the optical forwarding device according to FIG. 1.

FIG. 2 is a schematic diagram of the optical forwarding device according to FIG. 1. Referring to FIG. 2, in this embodiment, compared with the optical forwarding device 100 of FIG. 1, the first optical forwarding module 11 of an optical forwarding device 200 of FIG. 2 further includes optical connectors 2A-4A and 2B-4B. Herein, the optical connectors 2A and 2B are coupled to an optical transceiver TR2 of the central office equipment 190, the optical connectors 3A and 3B are coupled to an optical transceiver TR3 of the central office equipment 190, and the optical connectors 4A and 4B are coupled to an optical transceiver TR4 of the central office equipment 190.

In this embodiment, after receiving an optical signal L2a which has a wavelength $\lambda_2$ from the optical transceiver TR2, the optical connector 2A may forward the optical signal L2a to the first WDM 111 which is coupled to the optical connector 2A. The first WDM 111 may accordingly forward the optical signal L2a to the first port P11 of the first optical circulator P1, so that the first port P11 may forward the optical signal L2a to the second port P12.

Afterwards, the second port P12 may output the optical signal L2a to the specific optical connector 99 for transmission to the optical cable 199. On the other hand, the optical cable 199 may send an optical signal L2b which also has the wavelength $\lambda_2$ to the second port P12. The optical signal L2b may be forwarded to the third port P13 by the second port P12 to be output to the second WDM 112 by the third port P13.

Accordingly, the second WDM 112 which is coupled to the optical connector 2B may send the optical signal L2b from the third port P13 to the optical connector 2B, so that the optical connector 2B can send the optical signal L2b to the optical transceiver TR2.

Similarly, after the optical connector 3A receives an optical signal L3a which has a wavelength $\lambda_3$ from the optical transceiver TR3, the optical signal L3a may also be output to the optical cable 199 through the first WDM 111, the first port P11, the second port P12, and the specific optical connector 99 in sequence according to the foregoing teachings. Meanwhile, the optical cable 199 may send an optical signal L3b which also has the wavelength $\lambda_3$ to the second port P12. The optical signal L3b may also be output to the optical transceiver TR3 through the third port P13, the second WDM 112, and the optical connector 3B in sequence according to the foregoing teachings.

In addition, after the optical connector 4A receives an optical signal L4a which has a wavelength $\lambda_4$ from the optical transceiver TR4, the optical signal L4a may also be output to the optical cable 199 through the first WDM 111, the first port P11, the second port P12, and the specific optical connector 99 in sequence according to the foregoing teachings. Meanwhile, the optical cable 199 may send an optical signal L4b which also has the wavelength $\lambda_4$ to the second port P12. The optical signal L4b may also be output to the optical transceiver TR4 through the third port P13, the second WDM 112, and the optical connector 4B in sequence according to the foregoing teachings.

In this embodiment, assuming that the first WDM 111, the second WDM 112, and the first optical circulator P1 all support a first wavelength band, then the selected wavelengths $\lambda_1$-$\lambda_4$ may fall within the first wavelength band, so that the above technical solution can be successfully executed.

Figure 3:
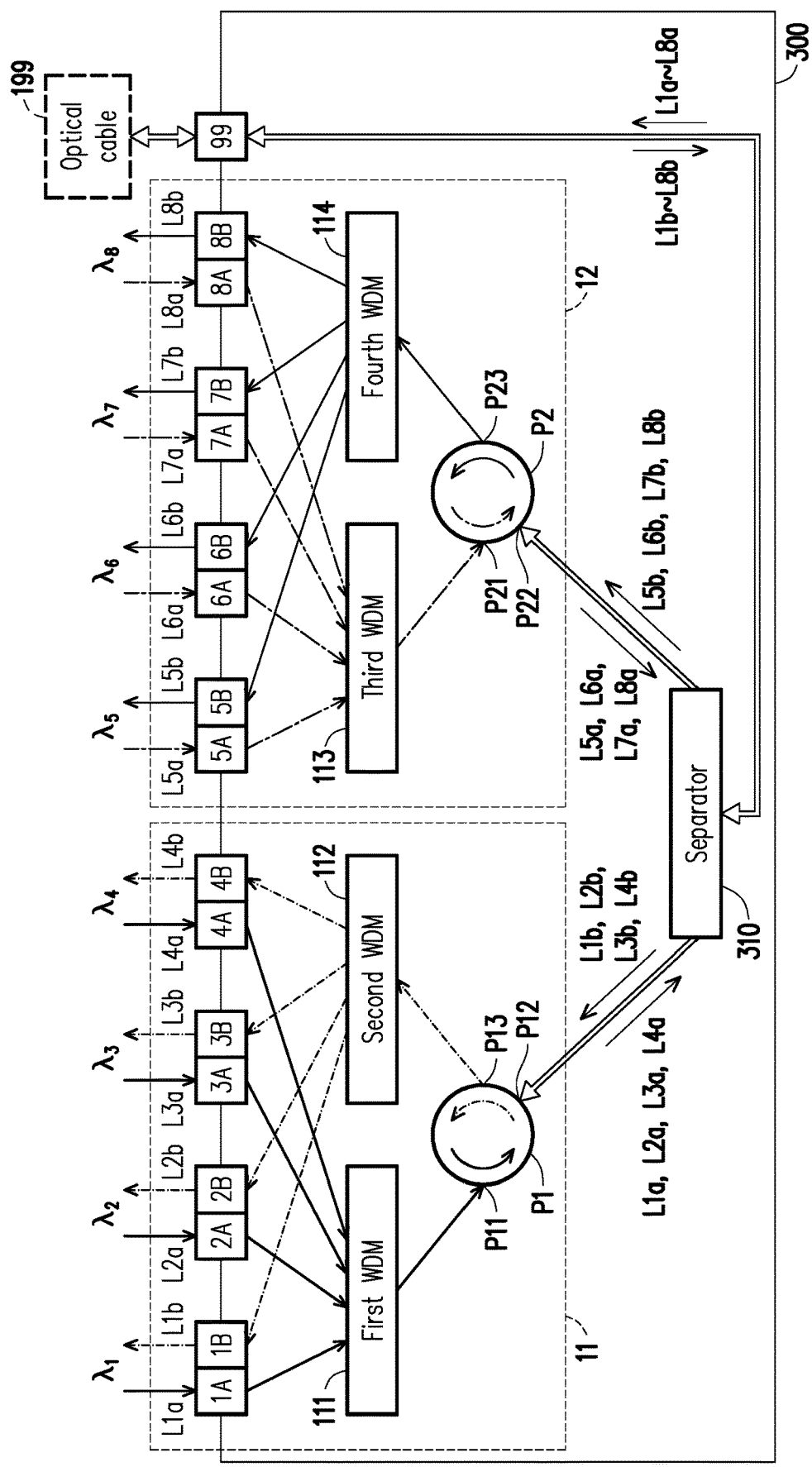
FIG. 3 is a schematic diagram of the optical forwarding device according to FIG. 2.

FIG. 3 is a schematic diagram of the optical forwarding device according to FIG. 2. Referring to FIG. 3, in this embodiment, compared with the optical forwarding device 200 of FIG. 2, an optical forwarding device 300 of FIG. 3 further includes a second optical forwarding module 12 and a separator 310.

As shown in FIG. 3, the separator 310 of this embodiment is connected between the second port P12 of the first optical circulator P1 and the specific optical connector 99, to output the optical signals L1a-L4a forwarded by the second port P12 to the optical cable 199 through the specific optical connector 99. Moreover, the separator 310 may also forward the optical signals L1b-L4b from the optical cable to the second port P12. Thereby, the optical signals L1b-L4b may be forwarded respectively to the optical connectors 1B-4B through the third port P13 and the second WDM 112 in sequence.

Furthermore, the configuration and the manner of operation of the second optical forwarding module 12 are substantially the same as those of the first optical forwarding module 11. Specifically, the second optical forwarding module 12 includes optical connectors 5A-8A and 5B-8B, a third WDM 113, a fourth WDM 114, and a second optical circulator P2. In this embodiment, the optical connectors 5A-8A and 5B-8B may form four sets of optical connector pairs, and the four sets of optical connector pairs may be coupled respectively to corresponding optical transceivers. However, the disclosure is not limited thereto.

As shown in FIG. 3, the third WDM 113 is coupled to the optical connectors 5A-8A. After respectively receiving the optical signals L5a-L8a (respectively having wavelengths $\lambda_5$-$\lambda_8$), the optical connectors 5A-8A may send the optical signals L5a-L8a to the third WDM 113.

The third WDM 113 may be coupled to a first port P21 of the second optical circulator P2, and may forward the optical signals L5a-L8a to the first port P21. Similar to the first optical circulator P1, the first port P21 of the second optical circulator P2 is a unidirectional input port, a second port P22 of the second optical circulator P2 is a bidirectional transmission port, and a third port 23 of the second optical circulator P2 is a unidirectional output port. Therefore, after receiving the optical signals L5a-L8a, the first port P21 may accordingly forward the optical signals L5a-L8a to the second port P22, so that the optical signals L5a-L8a may be output to the optical cable 199 through the separator 310 by the second port P22 which is coupled to the separator 310.

On the other hand, the optical cable 199 may transmit the optical signals L5b-L8b which have the wavelengths $\lambda_5$-$\lambda_8$ to the separator 310 through the specific optical connector 99, so that the separator 310 may forward the optical signals L5b-L8b to the second port P22. Accordingly, the second port P22 may forward the optical signals L5b-L8b to the third port P23 which is coupled to the fourth WDM 114, so that the optical signals L5b-L8b may be output to the fourth WDM 114 by the third port P23. Afterwards, the fourth WDM 114 may forward the optical signals L5b-L8b respectively to the optical connectors 5B-8B, so that the optical signals L5b-L8b may be output to the corresponding optical transceivers by the optical connectors 5B-8B.

In this embodiment, assuming that the third WDM 113, the fourth WDM 114, and the second optical circulator P2 all support a second wavelength band, then the selected wavelengths $\lambda_5$-$\lambda_8$ may fall within the second wavelength band, and the separator 310 can support the first wavelength band and the second wavelength band at the same time, so that the above technical solution can be successfully executed.

In summary of the foregoing, the optical forwarding device of the disclosure is mainly configured for the "unidirectional splitting of the optical wave path" for the optical wavelength sets of the entire WDM optical network, so that the incident wavelength sets and the emitted wavelength sets of the WDM can be transmitted within the range of the fiber channel, under the same conditions as the optical specifications of the original system, and will not affect the operations of optical transmission and reception of the existing WDM optical network due to the introduction of the optical forwarding device of the disclosure. In addition, in the disclosure, it is possible for the WDM optical network to perform bidirectional transmission by several sets (such as one set in FIG. 1, four sets in FIG. 2, and eight sets in FIG. 3) of same-wavelength pairs, which effectively reduces the number of wavelengths by up to half, and can be expanded to twice the wavelength capacity. Therefore, the disclosure can effectively improve the utilization rate of the optical fibers, and reduce the costs for preparation and deployment of color light module in the absence of modification to any existing optical network deployment.

It can be known from the above that the disclosure has at least the following characteristics: (1) The disclosure can be flexibly set in place of any WDM optical component, so that for the WDM in the WDM optical transmission network, several sets of bidirectional dual wavelength transmission can be directly converted to bidirectional paired single wavelength transmission; (2) The disclosure is an innovation that does not require modifications to any existing optical network deployment, which effectively reduces the number of wavelengths by up to half, and can be expanded to twice the wavelength capacity; (3) The disclosure is a passive component set which does not require any external power supply; (4) The disclosure does not limit the number of the wavelength for bidirectional communication, where the same wavelength sets can be used for bidirectional communication, which simplifies the sequencing of the wavelengths, and solves the problem of complicated WDM wavelength planning and difficulty in management; (5) The disclosure solves the problem of limitation on the number of WDM wavelength channels, and the number of wavelengths for use is immediately increased to twice, in the absence of additional deployment of optical fibers; and (6) The disclosure effectively reduces the excessive deployment costs and the time consumed during the deployment process.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical forwarding device comprising:
   a specific optical connector coupled to an optical cable; and
   a first optical forwarding module comprising:
     a first optical connector receiving a first optical signal;
     a second optical connector;
     a first wavelength division multiplexer coupled to the first optical connector, and receiving and forwarding the first optical signal from the first optical connector;
     a first optical circulator comprising:
       a first port coupled to the first wavelength division multiplexer to receive the first optical signal, and forwarding the first optical signal;
       a second port coupled to the specific optical connector, forwarding the first optical signal from the first port of the first optical circulator to the optical cable, receiving a second optical signal from the optical cable, and forwarding the second optical signal, wherein the second optical signal and the first optical signal both have a first wavelength; and
       a third port receiving and forwarding the second optical signal from the second port of the first optical circulator; and
     a second wavelength division multiplexer coupled to the third port of the first optical circulator and the second optical connector, receiving the second optical signal from the third port of the first optical circulator, and sending the second optical signal to the second optical connector, wherein the first optical connector and the second optical connector are directly connected to a first optical transceiver of central office equipment, wherein the first optical transceiver is configured to transmit and receive optical signals having the first wavelength.

2. The optical forwarding device according to claim 1, wherein the first optical forwarding module further comprises:
   a third optical connector receiving a third optical signal, and forwarding the third optical signal to the first wavelength division multiplexer, wherein the first wavelength division multiplexer receives the third optical signal from the third optical connector, and forwards the third optical signal to the first port of the first optical circulator; and
   a fourth optical connector;
   wherein the first port of the first optical circulator receives the third optical signal from the first wavelength division multiplexer, and forwards the third optical signal to the second port of the first optical circulator;
   the second port of the first optical circulator forwards the third optical signal from the first port to the optical cable, receives a fourth optical signal from the optical cable, and forwards the fourth optical signal to the third port of the first optical circulator, wherein the third optical signal and the fourth optical signal both have a second wavelength;
   the third port of the first optical circulator receives the fourth optical signal from the second port, and forwards the fourth optical signal to the second wavelength division multiplexer; and
   the second wavelength division multiplexer is further coupled to the fourth optical connector, receives the fourth optical signal from the third port, and sends the fourth optical signal to the fourth optical connector.

3. The optical forwarding device according to claim 2, wherein the third optical connector and the fourth optical connector are connected to a second optical transceiver of central office equipment, wherein the second optical transceiver is configured to transmit and receive optical signals having the second wavelength.

4. The optical forwarding device according to claim 1, wherein the first optical circulator, the first wavelength division multiplexer, and the second wavelength division multiplexer all support a first wavelength band, and the optical forwarding device further comprises a separator, wherein the separator is coupled between the second port of the first optical circulator and the optical cable, and supports the first wavelength band, and the second port of the first optical circulator forwards the first optical signal to the optical cable through the separator, and receives the second optical signal from the optical cable through the separator.

5. The optical forwarding device according to claim 4, wherein the first wavelength falls within the first wavelength band.

6. The optical forwarding device according to claim 4, wherein the separator further supports a second wavelength band, and the optical forwarding device further comprises a second optical forwarding module comprising:
   a fifth optical connector receiving a fifth optical signal;
   a sixth optical connector;
   a third wavelength division multiplexer coupled to the fifth optical connector, receiving and forwarding the fifth optical signal from the fifth optical connector, wherein the third wavelength division multiplexer supports the second wavelength band;
   a second optical circulator supporting the second wavelength band, and comprising:
      a first port coupled to the third wavelength division multiplexer to receive the fifth optical signal, and forwarding the fifth optical signal;
      a second port coupled to the specific optical connector through the separator, forwarding the fifth optical signal from the first port of the second optical circulator to the optical cable through the separator, receiving a sixth optical signal from the optical cable, and forwarding the sixth optical signal, wherein the sixth optical signal and the fifth optical signal both have a third wavelength; and
      a third port receiving and forwarding the sixth optical signal from the second port of the second optical circulator; and
   a fourth wavelength division multiplexer coupled to the third port of the second optical circulator and the sixth optical connector, receiving the sixth optical signal from the third port of the second optical circulator, and sending the sixth optical signal to the sixth optical connector, wherein the fourth wavelength division multiplexer supports the second wavelength band.

7. The optical forwarding device according to claim 6, wherein the third wavelength falls within the second wavelength band.

8. The optical forwarding device according to claim 1, wherein the first port of the first optical circulator is a unidirectional input port, the second port of the first optical circulator is a bidirectional transmission port, and the third port of the first optical circulator is a unidirectional output port.

\* \* \* \* \*